United States Patent
Pettersson et al.

(10) Patent No.: US 9,995,567 B2
(45) Date of Patent: Jun. 12, 2018

(54) METHOD AND DEVICE FOR DETERMINING 3D COORDINATES OF AN OBJECT

(71) Applicant: HEXAGON TECHNOLOGY CENTER GMBH, Heerbrugg (CH)

(72) Inventors: Bo Pettersson, London (GB); Knut Siercks, Mörschwil (CH); Eugen Voit, Au (CH); Jürg Hinderling, Marbach (CH); Benedikt Zebhauser, Rorschach (CH); Klaus Schneider, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 272 days.

(21) Appl. No.: 14/363,269

(22) PCT Filed: Dec. 6, 2012

(86) PCT No.: PCT/EP2012/074666
§ 371 (c)(1),
(2) Date: Jun. 5, 2014

(87) PCT Pub. No.: WO2013/083706
PCT Pub. Date: Jun. 13, 2013

(65) Prior Publication Data
US 2014/0320603 A1    Oct. 30, 2014

(30) Foreign Application Priority Data
Dec. 6, 2011 (EP) .................................. 11192217

(51) Int. Cl.
*H04N 13/239* (2018.01)
*H04N 13/275* (2018.01)
(Continued)

(52) U.S. Cl.
CPC .......... *G01B 11/002* (2013.01); *G01C 15/002* (2013.01); *G01S 17/023* (2013.01); *G01S 17/87* (2013.01); *G01S 17/89* (2013.01)

(58) Field of Classification Search
CPC ... G01B 11/002; G01C 15/002; G01S 17/023; G01S 17/87; G01S 17/89
(Continued)

(56) References Cited

U.S. PATENT DOCUMENTS 5,528,518 A    6/1996 Bradshaw et al.
5,977,908 A *  11/1999 Nichols .................. G01C 15/00
                                                     342/357.31
(Continued)

FOREIGN PATENT DOCUMENTS

CN    1685199 A    10/2005
CN    102252653 A    11/2011
(Continued)

OTHER PUBLICATIONS

Knoop et al., "Fusion of 2d and 3d sensor data for articulated body tracking", Robotics and Autonomous System 57 (2009), Institute of Computer Science and Engineering (CSE), University of Karlsruhe (TH), Germany.*
(Continued)

*Primary Examiner* — William C Vaughn, Jr.
*Assistant Examiner* — Joseph A Towe
(74) *Attorney, Agent, or Firm* — Maschoff Brennan (57) ABSTRACT

The invention relates to a method for determining 3D coordinates of an object (2) by a handheld laser-based distance measuring device (1), the method comprising determining an object point (20) at the object (2); measuring a distance (100) from the handheld laser-based distance measuring device (1) to the determined object point (20) by means of an EDM (10); capturing a 3D image (110) of the
(Continued)

object (2), the 3D image (110) includes the determined object point (20); identifying the determined object point (20) in the captured 3D image (110); and linking the measured distance (100) with the identified object point (20) in the 3D image (110). The invention also relates to a handheld laser-based distance measuring device (1) and a computer program product for execution of said method.

21 Claims, 5 Drawing Sheets

(51) Int. Cl.
    *H04N 13/296*     (2018.01)
    *G01B 11/00*     (2006.01)
    *G01C 15/00*     (2006.01)
    *G01S 17/87*     (2006.01)
    *G01S 17/89*     (2006.01)
    *G01S 17/02*     (2006.01)

(58) Field of Classification Search
    USPC .......................................................... 348/46
    See application file for complete search history.

(56) References Cited

U.S. PATENT DOCUMENTS

| | | | |
|---|---|---|---|
| 7,319,511 B2 | 1/2008 | Murai et al. | |
| 7,568,289 B2* | 8/2009 | Burlingham | G01C 15/002 33/284 |
| 7,860,301 B2* | 12/2010 | Se | G01C 11/06 348/43 |
| 8,072,581 B1* | 12/2011 | Breiholz | G01S 7/51 356/4.01 |
| 8,587,583 B2* | 11/2013 | Newcombe | G06T 17/00 345/420 |
| 2002/0001406 A1* | 1/2002 | Kochi | G01C 11/06 382/154 |
| 2003/0160757 A1* | 8/2003 | Shirai | G01C 1/04 345/156 |
| 2007/0139262 A1* | 6/2007 | Scherzinger | G01C 15/00 342/357.32 |
| 2007/0182950 A1* | 8/2007 | Arlinsky | G01C 3/02 356/5.01 |
| 2012/0062867 A1* | 3/2012 | Shibatani | G01C 3/085 356/4.01 |

FOREIGN PATENT DOCUMENTS

| | | | | |
|---|---|---|---|---|
| CN | 102252653 B | * | 9/2012 | |
| JP | S57-045406 A | | 3/1982 | |
| JP | 2004085551 B2 | * | 3/2004 | |
| WO | WO 2004036246 A1 | * | 4/2004 | H04M 1/21 |
| WO | 2006/084385 A1 | | 8/2006 | |
| WO | 2007/000067 A1 | | 1/2007 | |

OTHER PUBLICATIONS

Nakai et al., "3D Shape Measurement Using Fixed Camera and Handheld Laser Scanner", SICE Annual Conference 2008, Aug. 20-22, 2009, The University Electro-Communications, Japan.*
European Search Report dated May 3, 2012 as received in Application No. EP 11 19 2217.
Anonymous: "Total station—Wikipedia", Nov. 4, 2011.

* cited by examiner

$101 = \overline{2121'} = 25.231\text{m}$
$151 = \overline{21'21''} = 5.011\text{m}$
$151' = \overline{21''21'''} = 2.487\text{m}$
$152 = \overline{21''21'''} \times \overline{21'21''} = 12.50\text{m}2$
$153 = \overline{2121'} \times \overline{21''21'''} \times \overline{21'21''} = 62.50\text{m}3$

METHOD AND DEVICE FOR DETERMINING 3D COORDINATES OF AN OBJECT

FIELD OF THE INVENTION

The invention relates to a method and device for determining 3D coordinates of an object.

BACKGROUND

There exists a multitude of applications in various technical fields like for example, building construction, interior construction, mining industry, where an accurate determination of three-dimensional (3D) positions of an object is required. The object may have any shape and size.

One particular example of a device for a contactless determination of 3D coordinates of an object is an optical measuring means with an electronic distance meter (EDM), where a light source emits a light pulse towards the object and a semiconductor detector captures a light pulse that is back-scattered by the object. The distance between the object and the semiconductor detector is measured from the phase delay between a transmitted and a captured signal. The accuracy of the distance measurement amounts to some millimeters.

Such an EDM is commercialized by the applicant under the product name Disto™. This EDM is a handheld device which allows precise, fast and reliable distance measurements and enables on the site various calculations of heights, slopes, areas and volumes of an object.

SUMMARY

Aim of present invention is to provide an improved optical measuring means, which is at least one of cost-efficient, light-weight, easy-to-use and rugged.

Present invention relates to a method for determining 3D coordinates of an object by a handheld optical measuring means. The method comprises the step of determining an object point at the object; the step of measuring a distance from the handheld optical measuring means to the determined object point; capturing a 3D image of the object, the 3D image includes the determined object point; the step of identifying the determined object point in the captured 3D image; and the step of linking the measured distance with the identified object point in the 3D image.

In comparison to a photo sensor array (PSA) camera that captures two-dimensional (2D) images with a high image resolution of several million pixels, a TOF camera, which operates on the time-of-flight (TOF) principle, nowadays captures 3D images with a low image resolution of several thousand pixels. Each 3D image comprises a range image and an amplitude image. The range image contains for each pixel a radial measured distance between the object and the pixel of the TOF camera. The amplitude image contains, same as a 2D image, for each pixel the brightness of the received signal. Moreover, a TOF camera has a comparatively high signal-to-noise (STN) ratio. Therefore, for the sole purpose of imaging an object, a skilled person would refrain from using a TOF camera. Applicant recognized, however, that a combination of a TOF camera with an EDM results in a handheld optical measuring means with the following advantageous technical effects:

i) despite its low image resolution, a TOF camera captures in one single 3D image of the object a cloud of preferably several thousands of object points; and it is very likely, that in the near future this number will increase to several millions of object points, same as a PSA camera;

ii) the EDM measures with high accuracy a distance towards a single determined object point;

iii) by identifying the determined object point in the captured 3D image and linking the measured distance with the identified object point in the 3D image, the entire cloud of object points is accurately hooked in a reference position.

Present invention captures a 3D image with a cloud of object points and hooks this cloud in a reference position of a determined object point. No stored templates are needed, no user-dependent selection of a suitable template is required, no template adaptation with the aid of image processing is necessary for obtaining instantaneously and in a completely automated manner an accurately hooked cloud with preferably several thousands of object points. The purchase of a TOF camera is inexpensive, its housing is rugged, it has a small overall dimension and weighs light.

BRIEF DESCRIPTION OF THE DRAWINGS

In the subsequent detailed description of the figures, further advantages and features of the invention will be appreciated, in which.

DETAILED DESCRIPTION

Figure 1:
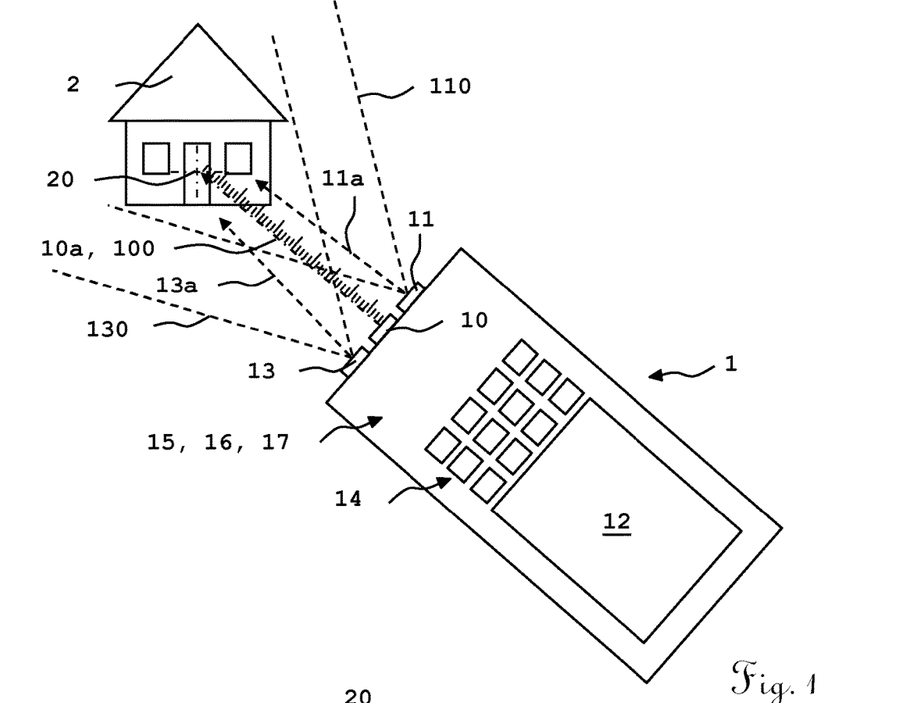
FIG. 1 shows a perspective view of a portion of a first embodiment of a handheld optical measuring means.
Figure 2:
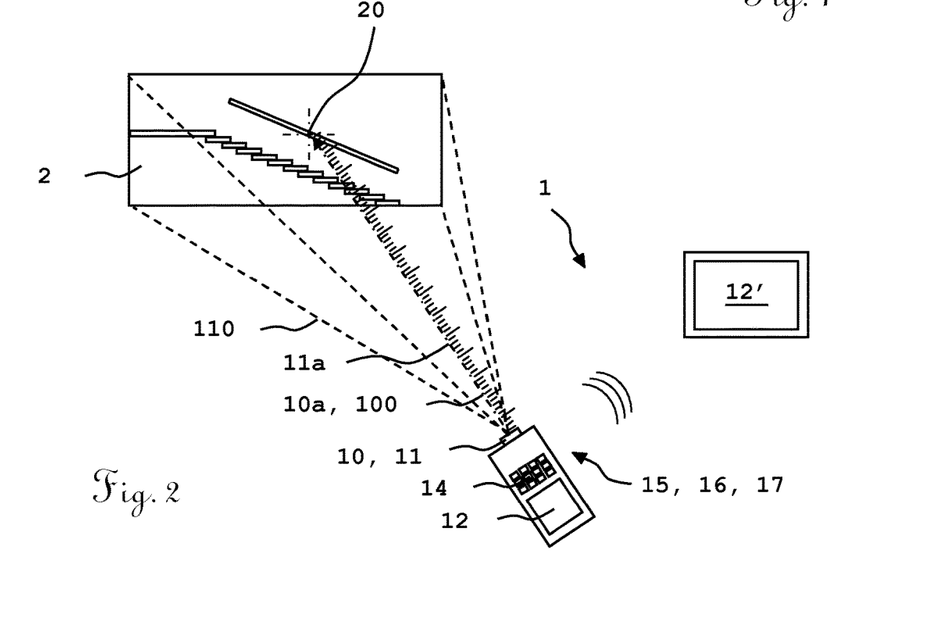
FIG. 2 shows a perspective view of a portion of a second embodiment of a handheld optical measuring means.

FIGS. 1 and 2 show two embodiments of a handheld optical measuring means 1 comprising an EDM 10 and a TOF camera 11. According to FIG. 1, the handheld optical measuring means comprises a PSA camera 13; according to FIG. 2, the handheld optical measuring means 1 comprises no PSA camera 13. During use, the optical measuring means 1 may be handheld or mounted on a tripod. The weight of the handheld optical measuring means 1 is in the range of less than 100 grams to some kilograms. Its dimensions are in the range of less than 100 cubic centimeters to some 1000 cubic centimeters. The handheld optical measuring means 1 has a battery pack as electric power supply. It has a protective housing that provides protection from bumps and drops and delivers resistance against dust and water.

According to FIG. 1 the handheld optical measuring means 1 has an integrated display means 12 for the visual output of object data. According to FIG. 2 the handheld optical measuring means 1 has an external display means 12' for the visual output of object data. It is also possible to use the integrated display means 12 and the external display means 12' of the handheld optical measuring means 1 simultaneously. Communication between the handheld optical measuring means 1 and the external display means 12' may occur over a wired communication standard like universal serial bus (USB) or Ethernet; this communication may also occur over a wireless communication standard like Bluetooth® or WiFi™. The user may input instructions through activation of an input means 14 like a button or a touch screen of the handheld optical measuring means 1.

Figure 3:
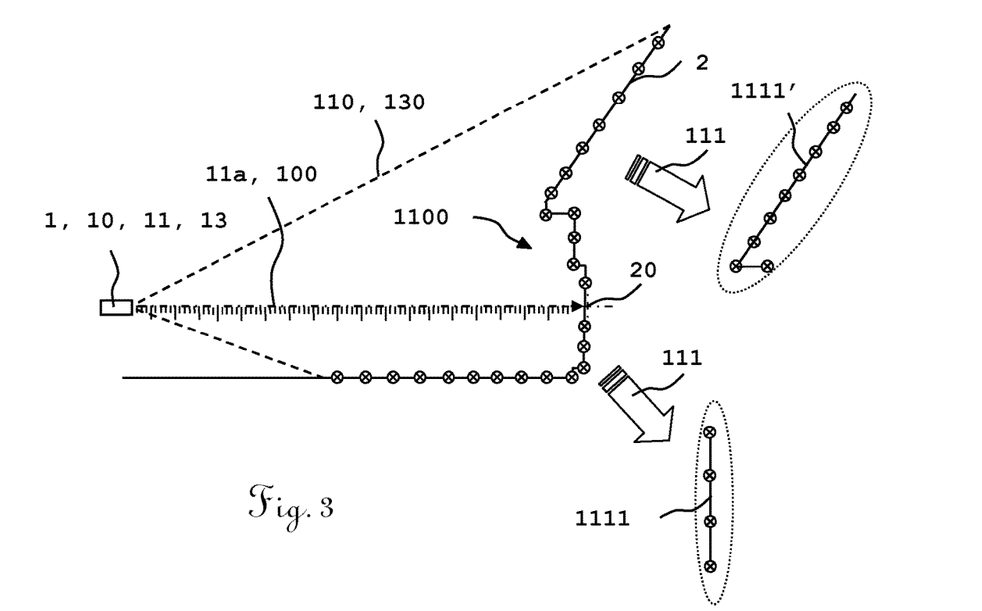
FIG. 3 shows a side view of the first embodiment of a handheld optical measuring means according to FIG. 1.

The EDM 10 has a light source like a laser diode for the emission of light pulses towards the object 2 and a semiconductor detector like a charge-coupled device (CCD) sensor or a complementary metal-oxide-semiconductor (CMOS) sensor for capturing back-scattered light pulses from the object 2. By aiming the EDM 10 on the object 2, an object point 20 may be determined. In the FIGS. 1 to 3, 6, 7, 9 and 10, the determined object point 20 is indicated by a crosshair. The beam of the emitted light pulses which is aimed on the object 2 may be visible for a user, for example through reflection of light pulses from the object 2. It is of course also possible, that the beam of the emitted light pulses is invisible for the user and that the invisible beam of the emitted light pulses is displayed on the display means 12, 12', for example by a crosshair. The EDM 10 has an accuracy of one or two millimeters over a distance range of 0.5 meters to 100 meters. In the FIGS. to 3, 6, 7, 9 and 10, the measured distance 100 is indicated by a scale-like line. For each measured distance 100, the EDM 10 issues a digital distance data signal 101. To indicate an emission axis 10a of the emitted light pulses, the EDM may issue a digital cursor data signal 102. In FIGS. 1 to 3, the emission axis 10a is indicated by a dotted line arrow. The distance data signal 101 and the cursor data signal 102 can be displayed on the display means 12, 12'. A default position of the emission axis 10a may be the centre of the display 12, 12'. The distance data signal 101 and the cursor data signal 102 can also be stored on a tangible machine-readable storage medium 16.

The TOF camera 11 has a light source like a laser diode or a light emitting diode (LED) to illuminate the object 2. The TOF camera 11 operates on the TOF principle. Back-scattered light from the object 2 is captured by a semiconductor detector like a CCD sensor or a CMOS sensor. Depending on the distance to the object 2, the light is temporal delayed, resulting in a phase difference between a transmitted signal and a received signal. Its field of view (FOV) is in the range of 30° to 70° with respect to a central optical axis 11a. The TOF camera 11 captures 3D images 110 with a frame grabber rate of down to ten milliseconds. Nowadays, the image resolution is limited to several thousands pixels, however, it is very likely, that in the near future this number will increase to several millions of pixels. Each pixel may be identified by a specific width coordinate and a specific length coordinate in a coordinate system of the TOF camera 11, like a Cartesian coordinate system of the CCD sensor or CMOS sensor of the TOF camera 11. By assuming that each pixel captures back-scattered light from one object point follows that the 3D image 110 contains a cloud of at least several thousand object points 1100. In FIG. 3, a portion of the object points 1100 are schematically depicted by a "cross in a circle" symbols.

Each 3D image 110 comprises a range image and an amplitude image. The range image contains for each pixel a radial measured distance between the object 2 and the pixel of the TOF camera 11. The accuracy of the radial measured distance amounts from one millimeter to several centimeters over a distance range of 0.5 meters to 60 meters. The amplitude image contains for each pixel the brightness of the received signal. The brightness has a dynamic range of between 20 dB and 60 dB. In FIGS. 1 and 2, the optical axis 11a is indicated by a broken line arrow; in FIGS. 1 to 3, 6 and 9 the 3D image 110 is indicated by a broken line. For each captured 3D image 110, the TOF camera 11 issues a digital 3D image data signal 111. The 3D image data signal 111 comprises for each point 1100 of the cloud a range image information and an amplitude image information. The 3D data signal 111 can be displayed on the display means 12, 12'. The 3D data signal 111 can be stored on a tangible machine-readable storage medium 16.

The PSA camera 13 is a CCD sensor based camera or CMOS sensor based camera that captures 2D images 130 with a high image resolution of several million pixels. Each pixel may be identified by a specific width coordinate and a specific length coordinate in a coordinate system of the PSA camera 13, like a Cartesian coordinate system of the CCD sensor or CMOS sensor of the PSA camera 13. The FOV is in the range of 30° to 70° with respect to a central optical axis 13a. The brightness has a dynamic range of between 20 dB and 100 dB. For each captured 2D image 130, the PSA camera 13 issues a digital 2D image data signal 131. The 2D data signal 131 can be displayed on the display means 12, 12'. The 2D data signal 131 can also be stored on a tangible machine-readable storage medium 16. The PSA camera 13 may have a zoom function for varying the FOV of the object 2. The zoom function may be realized as a digital zoom and/or as an optical zoom lens. In FIG. 1, the optical axis 13a is indicated by a broken line arrow and the 2D image 130 is indicated by a broken line.

The handheld optical measuring means 1 may have an integrated inclinometer 17 like an electrolytic tilt sensor for measuring inclinations of the handheld optical measuring means 1 with respect to a horizontal axis of up to +/−45°. For each measured inclination, the inclinometer issues a digital inclination data signal. The inclination data signal can be displayed on the display means 12, 12'. The inclination data signal can also be stored on a tangible machine-readable storage medium 16.

FIG. 1 shows an object 2 in the embodiment of a building; FIG. 2 shows an object 2 in the embodiment of stairs of a room. According to FIG. 1, the object point 20 which is determined by the user, is a portion of a door. According to FIG. 2, the object point 20 which is determined by the user, is a portion of the stairs. The EDM 10 provides a measured distance 100 with respect to the determined object point 20. The TOF camera 11 captures a 3D image 110 of the object 2. Linkage of the determined object point 20 with the 3D image 110 may occur mechanically or electronically.

For a mechanical linkage, the EDM 10 and the TOF camera 11 are mounted in the housing of the handheld optical measuring means 1 in a rigid manner, such that the emission axis 10a of the EDM 10 forms a fixed geometric relationship with the optical axis 11a of the TOF camera 11. As shown in FIGS. 1 and 2, the optical axis 11a of the TOF camera 11 forms an acute angle, preferably an angle between 0° and 10°, with the emission axis 10a of the EDM 10. The EDM 10 aims along the emission axis 10a at the determined object point 20. As the emission axis 10*a* forms a acute angle with the optical axis 11*a*, the 3D image 110 automatically includes the determined object point 20 in a central portion of the 3D image 110. In addition, the determined object point 20 is identifiable in the coordinate system of the TOF camera 11 by a specific width coordinate and a specific length coordinate with respect to the optical axis 11*a*. The coordinates of the determined object point 20 may be issued with the 3D data signal 111. In a similar rigid manner is the PSA camera 13 mounted in the housing, such that the optical axis 13*a* of the PSA camera 13 forms a fixed geometric relationship with the emission axis 10*a* of the EDM 10. As depicted in FIG. 1, the optical axis 13*a* of the PSA camera 13 may form an acute angle, preferably an angle between 0° and 10°, with the emission axis 10*a* of the EDM 10. The EDM 10 aims along the emission axis 10*a* at the determined object point 20. As the emission axis 10*a* forms a acute angle with the optical axis 13*a*, the 3D image 110 automatically includes the determined object point 20 in a central portion of the 2D image 130. In addition, the determined object point 20 is identifiable in the coordinate system of the PSA camera 13 by a specific width coordinate and a specific length coordinate with respect to the optical axis 13*a*. The coordinates of the determined object point 20 may be issued with the 2D data signal 131.

For an electronic linkage, the determined object point 20 is identified in the captured 3D image 110. This identification may occur by the user, who identifies the determined object point 20 in at least one of a corresponding 3D data signal 111 or a corresponding 2D data signal 131 which is displayed on the display means 12, 12'. The 3D data signal 111 and the 2D data signal 131 may be superposed such that they display a similar FOV of the object 2. The user may, for example through the input means 14, select a displayed cursor data signal 102 on the display 12, 12' to identify the determined object point 20 in the displayed 3D data signal 111 or 2D data signal 131. This identification may also occur automatically by a computer program which compares the cursor data signal 101 with at least one of a corresponding 3D data signal 111 or a corresponding 2D data signal 131. As each pixel of the 3D data signal 111 or the 2D data signal 131 is identifiable in the coordinate system of the TOF camera 11 or PSA camera 13 by a specific width coordinate and a specific length coordinate with respect to the optical axis 13*a* or optical axis 11*a*, the determined object point 20, which is the position of the cursor data signal 101 may be linked to a corresponding position of the 3D data signal 111 or 2D data signal 131. Once the determined object point 20 is identified in the captured 3D image 110, linkage of the measured distance 100 with the identified object point 20 in the 3D image 110 occurs.

The handheld optical measuring means 1 comprises a computing means 15 with a central processing unit (CPU) and a tangible machine-readable storage medium 16 like a read-only memory (ROM) or a random-access memory (RAM). The method according to the invention is stored in the machine-readable storage medium 16. The method is stored for example in the form of a computer program product. The computer program product is loaded as a computer program into the computing means 15 and the loaded computer program is executed by the computing means 15. The computing means interprets instructions of the loaded and executed computer program as well as instructions of the user. Present invention comprises a multitude of instructions, the following list of instructions is exemplary and is not intended to be exhaustive.

Instructions of the loaded and executed computer program concern the display of at least one of a distance data signal 101, a cursor data signal 102, a 3D data signal 111, a 2D data signal 131, an inclination data signal, an object point 20, a further object point 21, 21', 21'', 21''', 21'''', a multi-point distance 151, 151', an area 152, a volume 153, or a recognized geometric element 1111, 1111' on the display means 12, 12'.

Instructions of the user concern the determination of at least one of an object point 20, a further object point 21, 21', 21'', 21''', 21'''', or a geometric element 1111, 1111'.

Instructions of the loaded and executed computer program concern the determination of at least one of an object point 20, or a further object point 21, 21', 21'', 21''', 21''''.

Instructions of the loaded and executed computer program concern the identification of at least one of a determined object point 20 in a captured 3D image 110, a determined further object point 21, 21', 21'', 21''', 21'''' in a captured 3D image 110, a determined object point 20 in a captured 2D image 130, or a determined further object point 21, 21', 21'', 21''', 21'''' in a captured 2D image 130.

Instructions of the loaded and executed computer program concern the linkage of at least one of a measured distance 100 with an identified object point 20 in a captured 3D image 110, or a measured distance 100 with an identified object point 20 in a captured 2D image 130.

Instructions of the loaded and executed computer program concern the superposition of a captured 3D image 110 and a captured 2D image 130.

Instructions of the loaded and executed computer program concern the calculation of at least one 3D coordinate data of a of an object point 20, or one 3D coordinate data of a further object point 21, 21', 21'', 21''', 21''''; said 3D coordinate data being at least one of a multi-point distance 151, 151', an area 152, or a volume 153.

Instructions of the loaded and executed computer program concern the recognition of geometric element 1111, 1111' in at least one of a 3D data signal 111 or a 2D data signal 131.

Instructions of the loaded and executed computer program concern the hooking of at least one of a geometric element 1111, 1111' or a further object point 21, 21', 21'', 21''', 21'''' relative to an object point 20.

According to FIG. 3, the computer program performs geometric element recognition of at least one of a 3D data signal 111. As the 3D signal 111 of one 3D image 110 comprises for each object point 1100 of the cloud a range image data information with radial measured distance data information between the object 2 and a pixel of the TOF camera 11, geometric element recognition may detect similarities and variations in the 3D signal 111.

Similarities between object points 1100 comprise for example, radial measured distance data information which have a similar size or which evolve in space in a similar way. According to FIG. 3, a group of object points 1100 may be placed in a vicinity with respect to the Cartesian coordinate system of the CCD or CMOS sensor of the TOF camera 11 and may have similar radial measured distance data information; which group of object points 1100 may be recognized as a geometric element 1111, 1111' like a door or a roof.

Variations between object points 1100 comprise for example, radial measured distance data information which change abruptly in space. According to FIG. 3, a group of object points 1100 may be placed in a vicinity with respect to the Cartesian coordinate system of the CCD or CMOS sensor of the TOF camera 13 and may have a disruptive variation of the radial measured distance data information;

which group of object points 1100 may be recognized as a geometric element 1111 like an edge of a roof.

Figure 4:
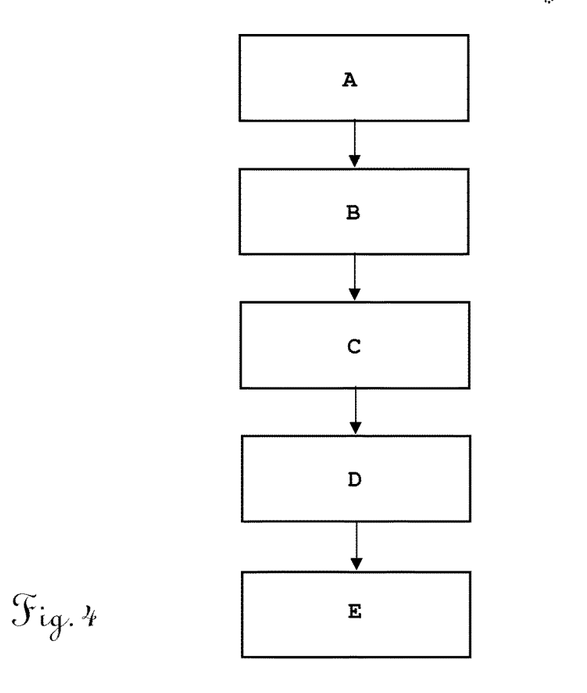
FIG. 4 shows a flow diagram with steps of the method for determining 3D coordinates of an object by a handheld optical measuring means according to FIG. 1 or 2.

FIG. 4 is a diagram with steps of the method of present invention. The computing means 15 interprets these instructions and controls the handheld optical measuring means 1 to perform the steps A to E of the method accordingly. In a step A an object point 20 at the object 2 is determined; in a step B, a distance 100 from the handheld optical measuring means 1 to the determined object point 20 is measured; in a step C, a 3D image 110 of the object 2 is captured, the 3D image 110 includes the determined object point 20; in a step D, the determined object point 20 is identified in the captured 3D image 110; and in a step E, the measured distance 100 is linked with the identified object point 20 in the 3D image 110.

Figure 5:
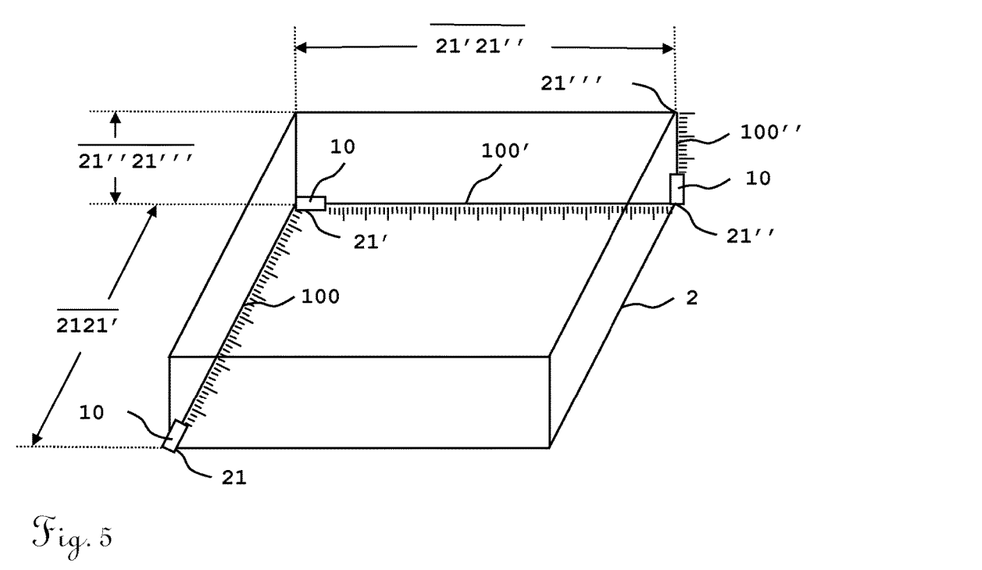
FIG. 5 shows a perspective view of a first embodiment of an area and volume calculation by an optical measuring means of the prior art.
Figure 7:
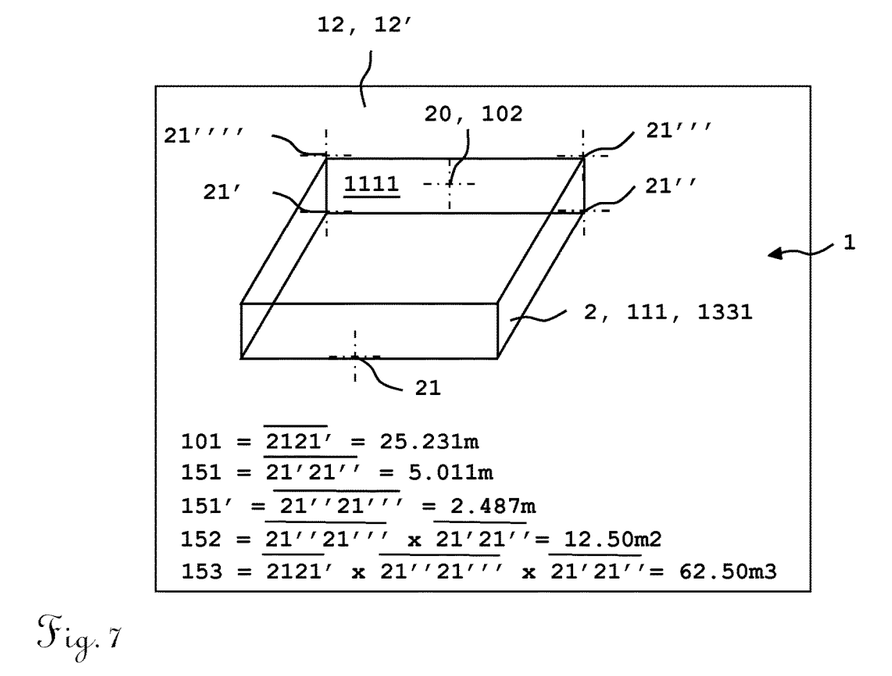
FIG. 7 shows a displayed view of a portion of the handheld optical measuring means according to FIG. 1 or 2 of the area and volume calculation according to FIG. 6.
Figure 8:
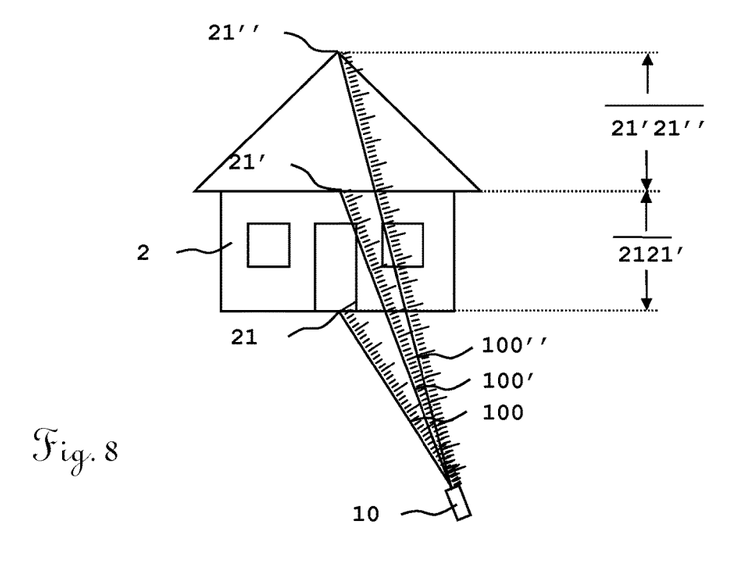
FIG. 8 shows a perspective view of a second embodiment of a multi-point distance calculation by a handheld optical measuring means of the prior art.

FIGS. 5 and 8 show two embodiments of area, volume and multi-point distance calculations of the prior art. In comparison, FIGS. 6, 7, 9 and 10 show corresponding embodiments of area, volume and multi-point distance calculations according to the method of present invention.

Figure 6:
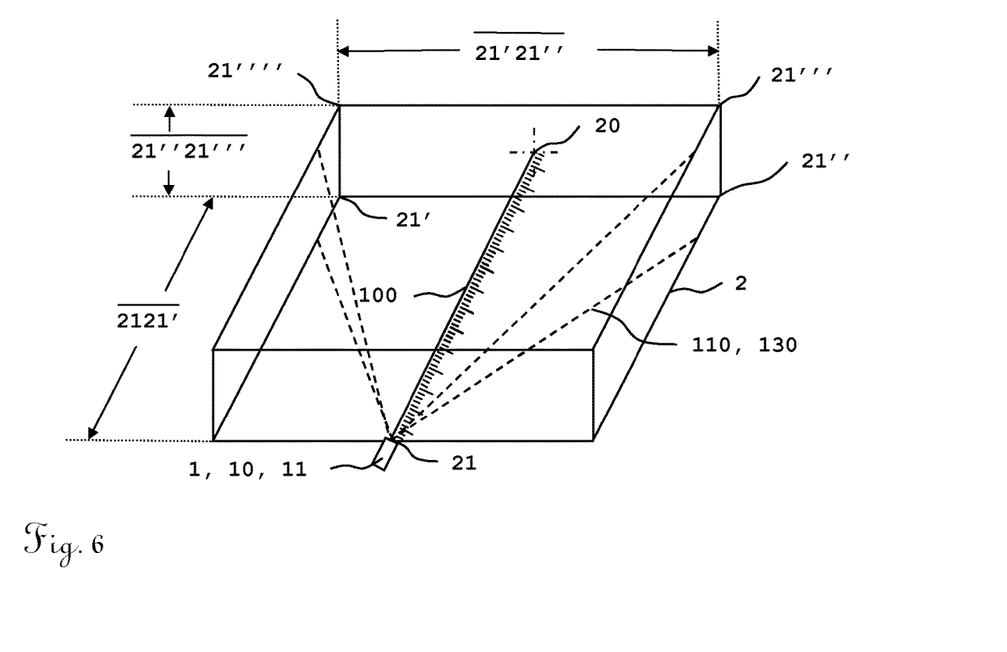
FIG. 6 shows a perspective view of a first embodiment of an area and volume calculation by the handheld optical measuring means according to FIG. 1 or 2.

According to FIGS. 5 to 7, an area 152 and volume 153 of an object 2 in the embodiment of a room shall be calculated.

To perform this area and volume calculation in the prior art according to FIG. 5, a user places an EDM 10 at several further object points 21, 21', 21" of the room and successively measures distances 100, 100', 100". For measuring a distance 100, the user places the EDM 10 at the further object point 21 and aims the further object point 21', the measured distance 100 corresponds to the length $\overline{2121'}$. Then, the user places the EDM 10 at the further object point 21' and aims the further object point 21", the measured distance 100' corresponds to the length $\overline{21'21''}$. Subsequently, the user places the EDM 10 at the further object point 21" and aims the further object point 21''', the measured distance 100" corresponds to the length $\overline{21''21'''}$. Placing the EDM 10 at several further object points 21, 21', 21" and performing a series of distance measurements is error-prone. Based on these measured lengths, the EDM 10 calculates an area 152 and a volume 153. The area 152 equals to the product of the first and second measured distances 100, 100'; the volume 153 equals to the product of the first, second and third measured distances 100, 100', 100".

To perform this area and volume calculation with the method of present invention according to FIGS. 6 and 7, a user places the handheld optical measuring means 1 at a further object point 21 and determines an object point 20 on a wall of the room. The handheld optical measuring means 1 measures a distance 100 to the determined object point 20 and captures a 3D image 110 of the wall with the determined object point 20. The handheld optical measuring means 1 links the measured distance 100 with the identified object point 20 in the 3D image 110. The measured distance 100 corresponds to the length $\overline{2121'}$.

Then, either the user or the handheld optical measuring means 1 determines at least one, preferably several further object points 21', 21", 21''', 21'''' in the captured 3D image 110 of the room.

Determination of a geometric element 1111 or a further object point 21', 21", 21''', 21'''' may occur by the user, who determines a geometric element 1111 or a further object point 21', 21", 21''', 21'''' in at least one of a corresponding 3D data signal 111 or a corresponding 2D data signal 131 which is displayed on the display means 12, 12'. The 3D data signal 111 and the 2D data signal 131 may be superposed such that they display a similar FOV of the object 2. By determining a geometric element 1111 or a further object point 21', 21", 21''', 21'''' in the displayed 2D data signal 131, the corresponding further object point 21', 21", 21''', 21'''' in the in superposition displayed 3D data signal 111 is automatically determined. The user may, for example through activation of the input means 14, select a characteristic point of the displayed 3D data signal 111 or 2D data signal 131 to determine a geometric element 1111 or a further object point 21', 21", 21''', 21'''' in the displayed 3D data signal 111 or 2D data signal 131.

Determination of a geometric element 1111 or a further object point 21', 21", 21''', 21'''' may also occur automatically by a computer program which performs geometric element recognition in the at least one of a 3D data signal 111 or a 2D data signal 131. Thus, the computer program recognizes the wall with the determined object point 20 as a geometric element 1111 and determines further object points 21', 21", 21''', 21'''' as characteristic points of this recognized geometric element 1111 like the corners of the wall with the determined object point 20. The geometric element 1111 and the further object points 21', 21", 21''', 21'''' may be hooked relative to the accurately measured object point 20.

Based on at least one radial measured distance of the range image of the 3D image 110 and the measured distance 100, the handheld optical measuring means 1 calculates at least one 3D coordinate data of the further object points 21', 21", 21''', 21'''' like multi-point distances 151, 151' between further object points 21', 21", 21''', 21''''. A first multi-point distance 151 corresponds to the length $\overline{21'21''}$ and a second multi-point distance 151' corresponds to the length $\overline{21''21'''}$. For doing so, lengths between the further object points 21', 21", 21''', 21'''' are calculated relative to the accurately measured object point 20 by known geometric relationships like the Pythagorean theorem. Based on these measured and calculated lengths, the handheld optical measuring means 1 calculates an area 152 and a volume 153. The area 152 equals to the product of the first measured distance 100 and the multi-point distance 151; the volume 153 equals to the product of the measured distance 100 and the multi-point distances 151, 151'. The calculated area 152 and the calculated volume 153 are displayed on the display means 12, 12'. The handheld optical measuring means 1 must be placed only once at a further object points 21 and only one distance measurement 100 must be measured and only one 3D image 110 must be captured. In comparison with the prior art calculation according to FIG. 5, the calculation according to FIGS. 6 and 7 is less time-consuming and less error-prone.

Figure 9:
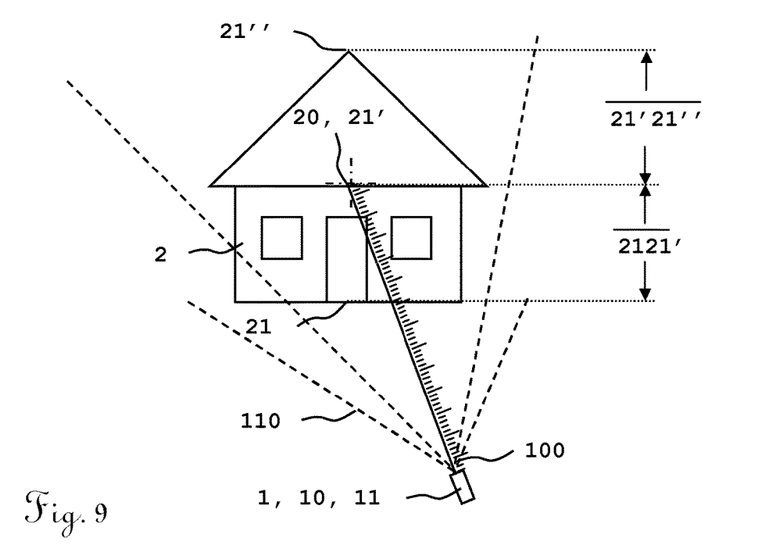
FIG. 9 shows a perspective view of a second embodiment of a multi-point distance calculation by the handheld optical measuring means according to FIG. 1 or 2.
Figure 10:
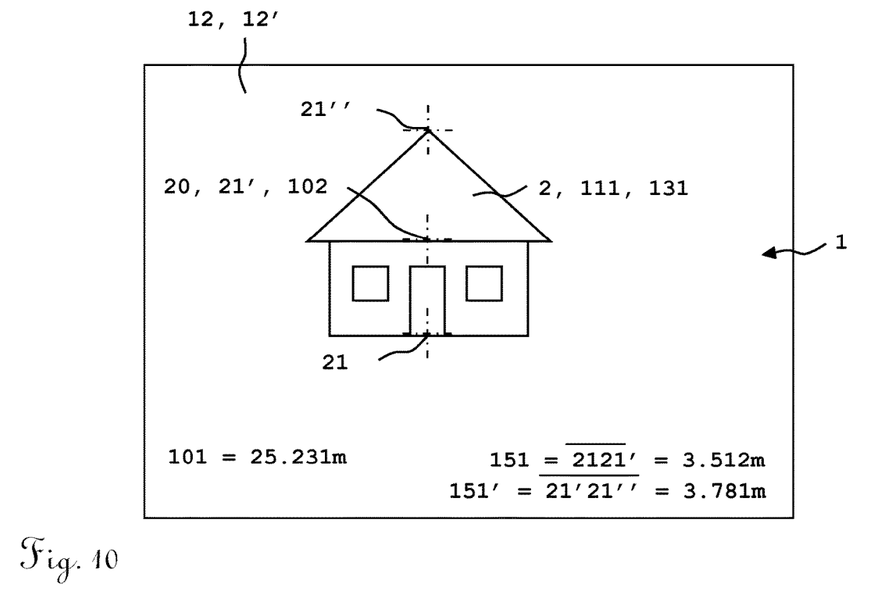
FIG. 10 shows a displayed view of a portion of the handheld optical measuring means according to FIG. 1 or 2 of the multi-point distance calculation according to FIG. 9.

According to FIGS. 8 to 10, multi-point distances of an object 2 in the embodiment of a building shall be calculated.

To perform this multi-point distance calculation in the prior art according to FIG. 8, a user places an EDM 10 in front of the building and aims the EDM 10 at several further object points 21, 21', 21" of the building and successively measures distances 100, 100', 100" between the EDM 10 in front of the building and the further object points 21, 21', 21". Based on these measured distances 100, 100', 100", the EDM 10 calculates multi-point distances 151, 151' between the further object points 21, 21', 21". A multi-point distance 151 corresponds to the length $\overline{2121'}$ and another multi-point distance 151' corresponds to the length $\overline{21'21''}$. Aiming the EDM 10 at several further object points 21, 21', 21" and performing a series of distance measurements is error-prone.

To perform this multi-point distance calculation with the method of present invention according to FIGS. 9 and 10, a user places the handheld optical measuring means 1 in front of the building and determines an object point 20 on the building. The handheld optical measuring means 1 measures a distance 100 to the determined object point 20 and captures a 3D image 110 of the building with the determined object point 20. The handheld optical measuring means 1 links the measured distance 100 with the identified object point 20 in the 3D image 110. Then, either the user or the handheld optical measuring means 1 determines several further object points 21, 21', 21" in the captured 3D image 110 of the building. Based on the radial measured distances of the range image of the 3D image 110, the handheld optical measuring means 1 calculates at least one 3D coordinate data of the further object points 21, 21', 21" like multi-point distances 151, 151' between the further object points 21, 21', 21". A multi-point distance 151 corresponds to the length $\overline{2121'}$ and another multi-point distance 151' corresponds to the length $\overline{21'21''}$. Calculated multi-point distances 151, 151' are displayed on the display means 12, 12'. The handheld optical measuring means 1 must be placed only once in front of the building and only one distance measurement 100 must be measured and only one 3D image 110 must be captured. In comparison with the prior art calculation according to FIG. 8, the calculation according to FIGS. 9 and 10 is less time-consuming and less error-prone.

The embodiments of the invention described above are intended to be merely exemplary; numerous variations, modifications and combinations will be apparent to those skilled in the art. All such variations, modifications and combinations are intended to be within the scope of present invention as defined in the claims. In particular, the resolutions of the TOF camera and of the PSA camera may be similar, i.e. the TOF camera and the PSA camera both may have a resolution of several thousand object points. It is even possible that the resolution of the TOF camera is higher than the resolution of the PSA camera. Such a resolution adaptation may occur by software binning or hardware binning and results in an improved STN ratio. Moreover, the frame grabber rates of the TOF camera and the PSA camera may be similar, but it is also possible that the frame grabber rate of the TOF camera is higher than the frame grabber rate of the PSA camera. It is also possible, that the TOF camera and PSA camera have different spectral selectivities, i.e. for imaging an infrared beam of emitted light pulses of the EDM by means of the PSA camera, which infrared beam may be displayed on the display means, while the TOF camera has a filter for blocking infrared light, which infrared light would negatively affect the STN ratio of the TOF camera.

What is claimed is:

1. A method for determining 3D coordinates of an object by a handheld laser-based distance measuring device, the method being performed by the handheld laser-based distance measuring device comprising:
   determining an object point at the object with the handheld laser-based distance measuring device;
   measuring a distance from the handheld laser based distance measuring device to the determined object point by means of an electronic distance meter (EDM) of the handheld laser-based distance measuring device;
   capturing a 3D image of the object, the 3D image including the determined object point with a time-of-flight (TOF) camera of the handheld laser-based distance measuring device;
   holding the handheld laser-based distance measuring device over ground supported only with a hand of the user during the measuring and capturing;
   identifying the determined object point in the captured 3D image with the handheld laser-based distance measuring device; and
   linking the measured distance measured by the electronic distance meter with the identified object point in the 3D image with the handheld laser-based distance measuring device.

2. The method according to claim 1, wherein
   the electronic distance meter (EDM) aims at the determined object point along an emission axis;
   the emission axis forms a fixed geometric relationship with an optical axis of the TOF camera; and
   the determined object point is identifiable in a coordinate system of the TOF camera with respect to the optical axis,
   the method further comprising simultaneously aiming the EDM and the TOF camera at the determined object point by hand.

3. The method according to claim 1, wherein
   a 2D image of the object is captured, the 2D image includes the determined object point;
   the determined object point is determined in the captured 2D image; and
   the measured distance is linked with the identified object point in the 2D image.

4. The method according to claim 3, wherein
   the electronic distance meter (EDM) aims at the determined object point along an emission axis;
   a photo sensor array (PSA) camera captures the 2D image with determined object point;
   the emission axis forms a fixed geometric relationship with an optical axis of the PSA camera; and
   the determined object point is identifiable in a coordinate system of the PSA camera with respect to the optical axis.

5. The method according to claim 3, wherein
   the captured 3D image of the determined object point and the captured 2D image of the determined object point are superposed; and
   the superposed images of the determined object point are displayed.

6. The method according to claim 1, wherein
   the electronic distance meter (EDM) aims at the determined object point along an emission axis and issues a cursor data signal indicating the emission axis;
   a time-of-flight (TOF) camera issues for a captured 3D image an 3D data signal; or
   a photo sensor array (PSA) camera captures a 2D image with the determined object point and issues for a captured 2D image an 2D data signal; and
   a position of the cursor data signal is linked to the 3D data signal or 2D data signal.

7. The method according to claim 1, wherein
   at least one of a further object point is determined or a geometric element is recognized.

8. The method according to claim 7, wherein
   the determined further object point or recognized geometric element is hooked relative to the measured object point.

9. The method according to claim 1, wherein
   a further object point in a 3D data signal or 2D data signal being displayed is determined through selection of at least one characteristic point of the displayed 3D data signal or 2D data signal, said characteristic point being the further object point.

10. The method according to claim 1, wherein
    geometric element recognition with at least one of a 3D data signal of a captured 3D image or a 2D data signal of a captured 2D image is performed;

a geometric element in at least one of the 3D data signal or the 2D data signal is recognized; and/or a geometric element in at least one of the 3D data signal or the 2D data signal is recognized, and at least one characteristic point of the geometric element is determined, said characteristic point being the further object point.

11. The method according to claim 1, wherein
at least one 3D coordinate data of the object point is calculated, said 3D coordinate data being from at least one of a multi-point distance calculation, an area calculation, or a volume calculation; and
the 3D coordinate data is calculated based on at least one radial measured distance of a range image of the 3D image and the measured distance.

12. The method according to claim 1, wherein
at least one 3D coordinate data of the further object point is calculated, said 3D coordinate data being from at least one of a multi-point distance calculation, an area calculation, or a volume calculation; and
the 3D coordinate data is calculated based on at least one radial measured distance of a range image of the 3D image and the measured distance.

13. A handheld laser-based distance measuring device, comprising:
an electronic distance meter (EDM) for measuring a distance from the handheld laser-based distance measuring device to the determined object point;
a time-of-flight (TOF) camera for capturing a 3D image of the object; and
a computer having a central processing unit with a tangible machine-readable carrier with at least one computer program for executing the method comprising:
determining an object point at the object;
measuring a distance from the handheld laser based distance measuring device to the determined object point by means of an EDM;
capturing a 3D image of the object, the 3D image including the determined object point;
identifying the determined object point in the captured 3D image; and
linking the measured distance with the identified object point in the 3D image; and
a housing having the EDM, TOF camera and computer, the housing being configured to be supported off of ground only by a hand of a user during the measuring and capturing and simultaneously aiming the EDM and the TOF camera at the determined object point by hand.

14. The handheld laser-based distance measuring device according to claim 13, wherein
the electronic distance meter (EDM) and the time-of-flight (TOF) camera are mounted in the housing of the handheld laser-based distance measuring device in a rigid manner; and
an optical axis of the TOF camera forms a fixed geometrical relationship with an emission axis of the EDM.

15. The handheld laser-based distance measuring device according to claim 14, wherein
a photo sensor array (PSA) camera for capturing a 2D image of the object; and
a display for displaying at least one of a measured distance, a cursor data signal indicative of an emission axis, a 3D data signal for a captured 3D image, a 2D data signal for a captured 2D image, an inclination data signal for a measured inclination, a determined object point, a determined further object point, a recognized geometric element, a 3D coordinate data of the object point, or a 3D coordinate data of the further object point.

16. A computer program product comprising:
a non-transitory tangible machine-readable storage medium that includes computer-executable instructions for determining 3D coordinates of an object by a handheld laser-based distance measuring device while holding the handheld laser-based distance measuring device over ground supported only with a hand of the user during measuring and capturing, which when executed by a processor performs the method of claim 1.

17. The computer program product according to claim 16, wherein
the electronic distance meter (EDM) aims at the determined object point along an emission axis;
the emission axis forms a fixed geometric relationship with an optical axis of the TOF camera; and
the determined object point is identifiable in a coordinate system of the TOF camera with respect to the optical axis.

18. The computer program product according to claim 17, wherein
a 2D image of the object is captured, the 2D image includes the determined object point;
the determined object point is determined in the captured 2D image; and
the measured distance is linked with the identified object point in the 2D image.

19. The computer program product according to claim 18, wherein
the electronic distance meter (EDM) aims at the determined object point along an emission axis;
a photo sensor array (PSA) camera captures the 2D image with determined object point;
the emission axis forms a fixed geometric relationship with an optical axis of the PSA camera; and
the determined object point is identifiable in a coordinate system of the PSA camera with respect to the optical axis.

20. The method according to claim 16, wherein
a 2D image of the object is captured, the 2D image includes the determined object point;
the determined object point is determined in the captured 2D image; and
the measured distance is linked with the identified object point in the 2D image.

21. The handheld laser-based distance measuring device according to claim 13, wherein
a photo sensor array (PSA) camera for capturing a 2D image of the object; and
a display for displaying at least one of a measured distance, a cursor data signal indicative of an emission axis, a 3D data signal for a captured 3D image, a 2D data signal for a captured 2D image, an inclination data signal for a measured inclination, a determined object point, a determined further object point, a recognized geometric element, a 3D coordinate data of the object point, or a 3D coordinate data of the further object point.

* * * * *